United States Patent Office 3,597,153
Patented Aug. 3, 1971

3,597,153
RECOVERY OF VANADIUM FROM MAGNETITE
Milton G. M. Atmore, Johannesburg, Transvaal, Republic of South Africa, Ewen T. Pinkney, Avondale, Salisbury, Southern Rhodesia, and Alan L. Guise-Brown, Johannesburg, Transvaal, Republic of South Africa, assignors to Anglo American Corporation of South Africa Limited
Continuation-in-part of application Ser. No. 596,318, Nov. 22, 1966. This application July 30, 1969, Ser. No. 858,555
Int. Cl. C22b *59/00;* C01g *31/00*
U.S. Cl. 23—16  3 Claims

ABSTRACT OF THE DISCLOSURE

A method of extracting vanadium from vanadiferous iron ores with reduced kiln ringing-up, comprising comminuting the ore, adding less than 3% by weight of the total mix of sodium sulfate and less than 3% by weight of the total mix of at least one of the substances selected from the group consisting of sodium carbonate and sodium bicarbonate, passing the mix into an inclined kiln at the upper end of the kiln, wherein the kiln is equipped with a burner at the lower end thereof, raising the temperature in the kiln to give a temperature gradient in the kiln such that the temperature at the lower outlet end varies from 1100 to 1300° C. and permitting the vanadium in the mix to react with at least one of the additives to yield a soluble vanadium compound in the product of the kiln.

CROSS-REFERENCE TO RELATED APPLICATIONS

Figure 1:
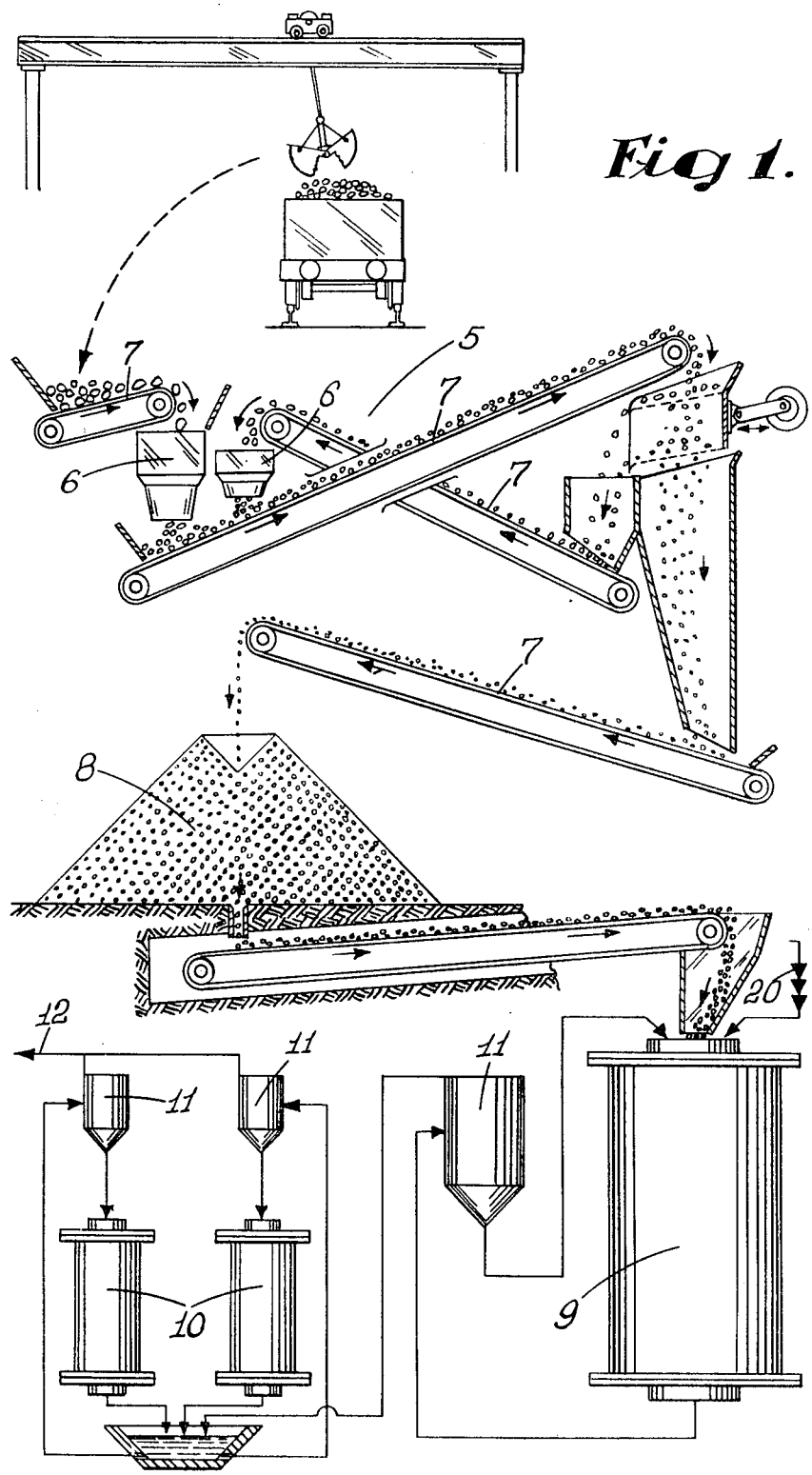

The present application is a continuation-in-part application of Ser. No. 596,318, filed Nov. 22, 1966 by the same inventors, and now abandoned.

This invention relates to the recovery of vanadium from vanadiferous iron ores, for example magnetite.

It is part of the common knowledge in the art to extract vanadium from magnetite through the medium of multihearth mechanically rabbled roasters of the Skinner type. The Skinner roaster is characterised in a vertical tower which is separated axially into a series of compartments, each of which has a cone shaped floor sloping upwardly towards an apex. The apices of the compartments are co-axial with respect to the principal axis of the tower and looked at in plan the arrangement presents a central bore for the accommodation of a rotatable spindle. Arms radiate from the spindle into each compartment and the arms are fitted with downwardly depending teeth whose purpose will be explained later.

In dealing with the extraction of vanadium from magnetite, the raw material in a finely milled state together with a controlled quantity of sodium chloride is fed on to the floor of the upper compartment of the roaster. Burners in this compartment act to raise the temperature of the mix and the teeth act as spades for urging the material towards an outlet from the upper compartment. For the sake of this description the material may be said to enter the upper compartment of the roaster towards the periphery of the device. The teeth or spades then gradually move the material towards the outlet from the first compartment which is adjacent the spindle, the material then gravitating on to the floor of the second compartment.

In the second compartment the teeth then urge the material outwardly towards an escape port towards the periphery of this chamber, and all the while burners in this compartment act to maintain or increase the temperature of the mix. So the process proceeds through a number of such compartments until the finished product emerges below the lowermost compartment.

Within the roaster the magnetite is caused to react with the sodium chloride to produce within the mix a soluble vanadium compound. Extraction of the vanadium then proceeds by immersing the product of the roaster in a leaching bath.

The Skinner roaster is not entirely satisfactory for several reasons. It is a complex piece of apparatus which is costly to maintain and the vanadium yield using this type of apparatus is not particularly high. To improve on the Skinner roaster attempts have been made to use a rotating tubular kiln inclined slightly from the horizontal. The raw material is added to the kiln at its raised end and the necessary burner is usually located in a combustion chamber at the low end of the kiln. The raw material advances towards the combustion chamber on rotation of the kiln ultimately to escape through a port in the neighborhood of the burner. Tests of this character yielded disappointing results since the additive, again sodium chloride, in fusing caused the bore of the kiln to ring-up. As the skin of fused sodium chloride grew so the efficiency of the kiln fell away and under these circumstances nothing was gained over the performance of the Skinner roaster. But one aspect became clear in these tests. At the outset, i.e. prior to the ringing-up developing, the extraction of vanadium using the rotating kiln was sensibly higher than in comparable circumstances using the Skinner roaster. As ringing-up proceeded the through-put fell away making the comparison less favourable.

The benefits to be derived with the rotating kiln justified further experiments and applicant now comes forward with an arrangement which renders it possible to use the kiln in question without fear of undue ringing-up developing.

According to the invention a method of extracting vanadium from vanadiferous iron ores includes the steps of comminuting the ore, adding thereto less than 3% by weight of the total mix of sodium sulphate and less than 3% by weight of the total mix of at least one of the substances selected from the group consisting of sodium carbonate and sodium bicarbonate, passing the mix into an inclined kiln equipped with a burner at its lower outlet end, raising the temperature of the kiln to give a temperature at its upper inlet end of approximately 500 degrees C. and a temperature of about 1100 to 1300 degrees C. at the lower outlet end, and permitting the vanadium in the mix to react with at least one of the additives to yield a soluble vanadium compound in the product of the kiln.

Further according to the invention the temperature of the mix is raised in the kiln in the presence of about 4% free oxygen.

Also according to the invention the sodium sulphate constitutes about 1% of the total mix and the additives collectively constitute about 3½% of the total mix.

In order to illustrate the invention an example is described hereunder with reference to the accompanying drawings in which:

FIGS. 1 to 4 collectively and progressively depict the plant employed for the recovery of vanadium pentoxide from magnetite.

In FIG. 1, the ore is passed through a crushing stage 5 made up of rotary crushers 6 and conveyor belts 7. The ore passes along the final conveyor to a dump 8 from which it is drawn off for treatment in a further milling stage made up of primary ball mills 9 and secondary ball mills 10. Cyclones 11 are used in the ball milling stage to facilitate the production of a suitable fine sludge for passing in the direction of arrow 12 to a further cyclone 13. In practice the sludge delivered to cyclone 13 should be in the range 70% water and 30% solids.

Figure 2:
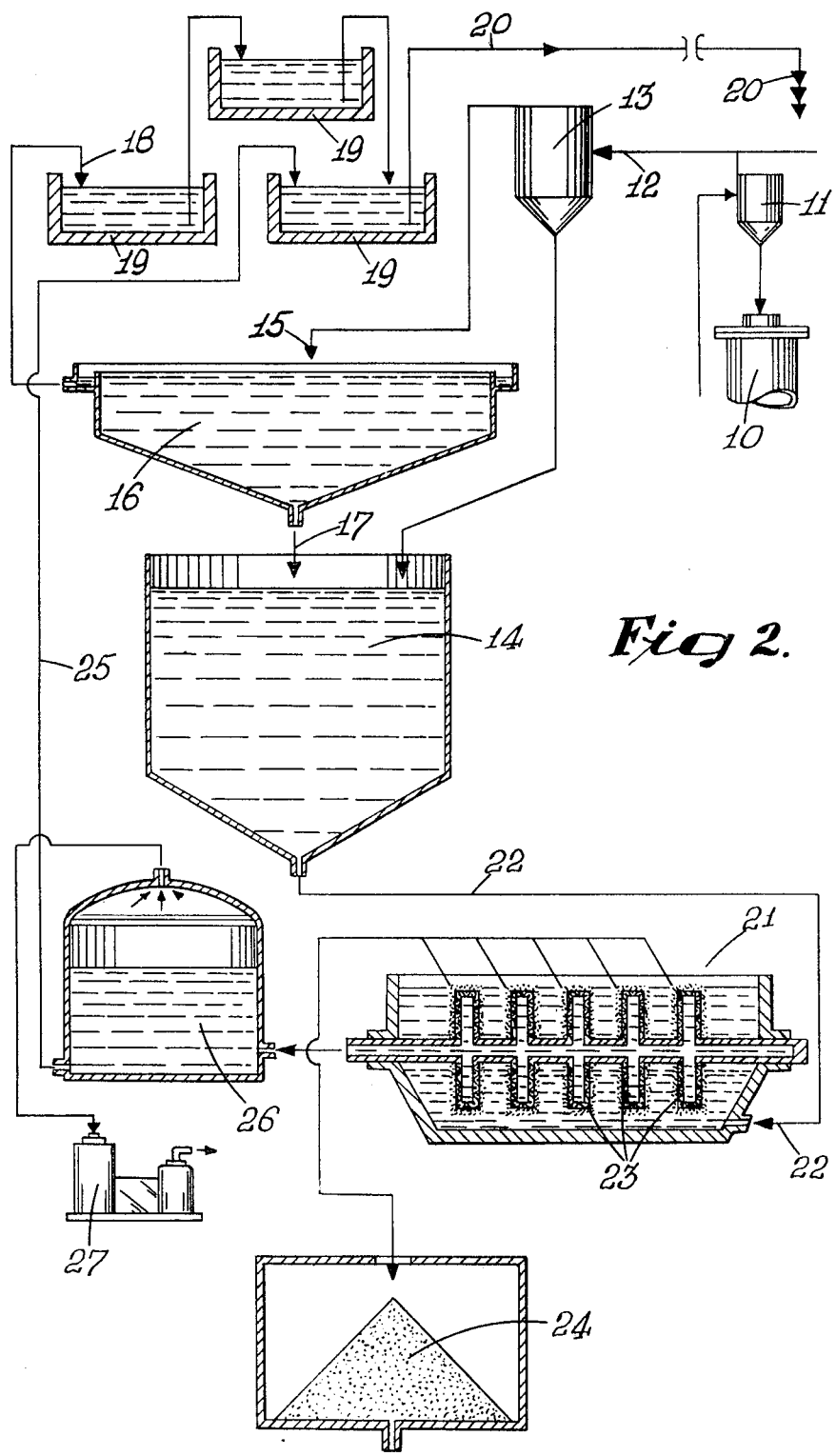

From cyclone 13 the process continues in the manner illustrated in FIG. 2. The heavy material from the cyclone passes to pachuca reservoir 14 where it is estimated that only about 35% constitutes water, the rest being magnetite. The light material passes in the direction of arrow 15 to thickener 16. In the process followed in the example under consideration the heavy settlement in the thickener passes in the direction of arrow 17 to the pachuca 14 while the overflow liquid passes in the direction of arrow 18 to settling tanks 19 from whence it is returned along arrow 20 to the ball mills.

The pachuca acts as a supply reservoir for a disc 30 type cloth filter 21, the sludge from the pachuca passing to the filter 21 along the path 22. The discs 23 in the filter de-water the sludge in customary manner, the solids off the discs passing to dump 24 while the water is delivered to the settling tanks 19 along the path 25. In the path 25 there is a conventional suction tank 26 associated with vacuum pump 27 for drawing the water through the disc filters. One should strive to maintain the water content of the material in dump 24 to a percentage not in excess of about 9%. At this stage the magnetite has been milled to a fineness which is adequate for treatment in a kiln.

From dump 24 the material gravitates on to a rotating dispensing table 28 and deflecting blade 29 serves to urge the material on to the conveyor 30 as the table rotates in the direction of arrow 31. A net dispersal of the material in a band on the conveyor is desirable in order to obtain a general mixing of the additives with the material. In trailing relationship to the dispensing table 28 there are two additive dispensers 32 and 33. Dispenser 32 is adjusted to deliver about 3 lbs. 2 ozs. of sodium carbonate to the underlying conveyor per 95 lbs. of ore delivered from the dispensing table, and dispenser 33 delivers about 1 lb. 4 ozs. of sodium sulphate per 95 lbs. of ore delivered to the conveyor. Batches of sodium carbonate are indicated by the reference 34 and batches of sodium sulphate by reference 35.

Conveyor 30 moves the material in the direction of arrow 36 towards the inlet 37 to a rotary drier 38 whose purpose is to drive off as much moisture as possible. The moisture moves in the direction of arrow 39 to a cyclone 40 on the outlet side of the drier and the cyclone traps solids so that they may be returned to the path of the material in the direction of arrow 41 while the gases pass to stack 42.

The solids from the drier emerge at exhaust port 43 and fall on to conveyor 44 for conveyance to the inlet 45 of rotating kiln 46. By the time the material reaches the inlet 45 the additives and the magnetite are intimately mixed. Kiln 46 is fired on coal dust which enters the combustion chamber 47 in conventional manner where it is ignited by burner 48. The tilt of the kiln is important and applicants have found that successful operations may be carried out where the angle of the kiln is as small as 5 degrees from the horizontal. Either concurrent or counter-current firing may be used, although in the preferred arrangement counter-current firing is employed. Free oxygen should be present in the gases used for heating the material in the kiln and ideally 4% free oxygen is employed.

The material is tumbled down the kiln in the direction of arrows 49 ultimately to fall into the sump zone 50 in the combustion chamber from whence the calcined material passes out at port 51. Below port 51 brick lined trucks 65 are used to collect the material passing out of the kiln. The material is left to stand in the trucks long enough to permit a suitable degree of cooling to take place.

Preferably drying in the drier 38 is effected or facilitated by using the waste gases from the kiln which pass along duct 52 from the kiln to the drier.

Satisfactory results appear to be obtained where the temperature in the kiln close to the kiln inlet is of the order of 500 degrees C. At the combustion end of the kiln temperatures of the order of 1100–1300 degrees C. are preferred.

Oil, gas, coal or other suitable fuel may be used for heating the kiln but pulverised coal mixed with air and ignited by a burner has been found ideal for heating magnetite. As mentioned above the combustion chamber 47 houses the burner in the example under consideration and firing takes place in this chamber. On the other hand firing directly into the kiln may be employed. Fan means may be used to withdraw the products of combustion to assist their movement towards the stack 42. Some water vapour should be present in the gases used and this is most easily obtained from the products of combustion.

Roasting within the kiln should last about ninety minutes but this is a factor which must be looked at in relationship to the speed of rotation of the device and other variables. The roasted ore, which is referred to in the art as calcine, discharges through the outlet from the kiln for movement towards a leaching tank 53 which is fed from conveyor 54, the conveyor receiving its supplies of calcine from the outlet of the kiln. It is in the leaching tank that solid sodium vanadate is dissolved. Water, dilute acids or dilute alkalis may be used but ideally water is employed for leaching out the vanadium. The calcine may be rapidly quenched while hot although quenching prior to leaching is preferred.

The pregnant solution of sodium vanadate passes through a sand filter bed 55 on its way through duct 56, a storage tank 57 from which it passes to a precipitation section 58, deammoniators 59, evaporators 60, gas scrubbers 61, coolers 62 and roller crushers 63. The vanadium pentoxide thus produced is then ready for packing in drums 64. In the precipitation section the vanadium is precipitated out as ammonium meta-vanadate and following de-ammoniation it is provided as vanadium pentoxide.

Figure 3:
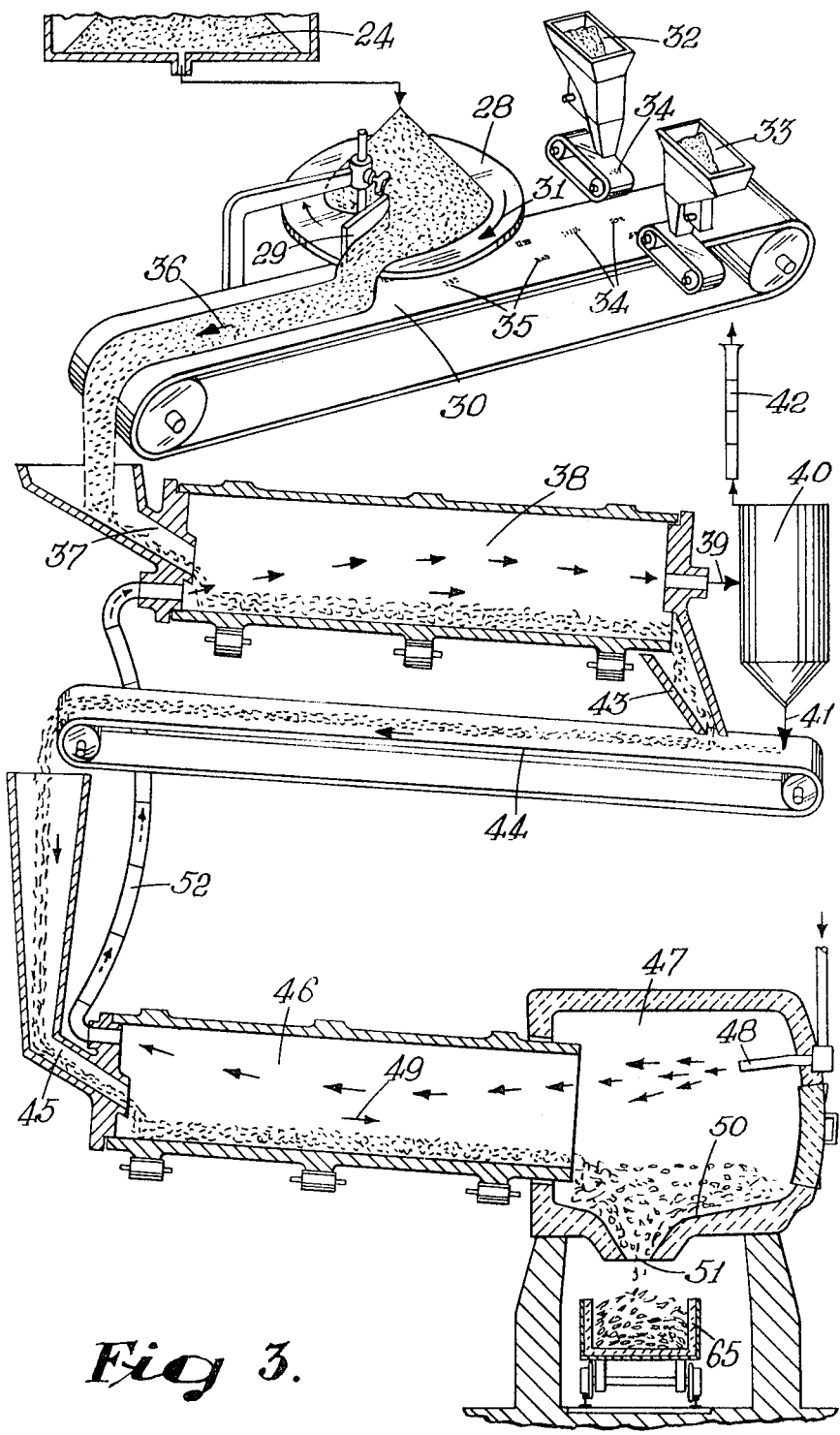
Figure 4:
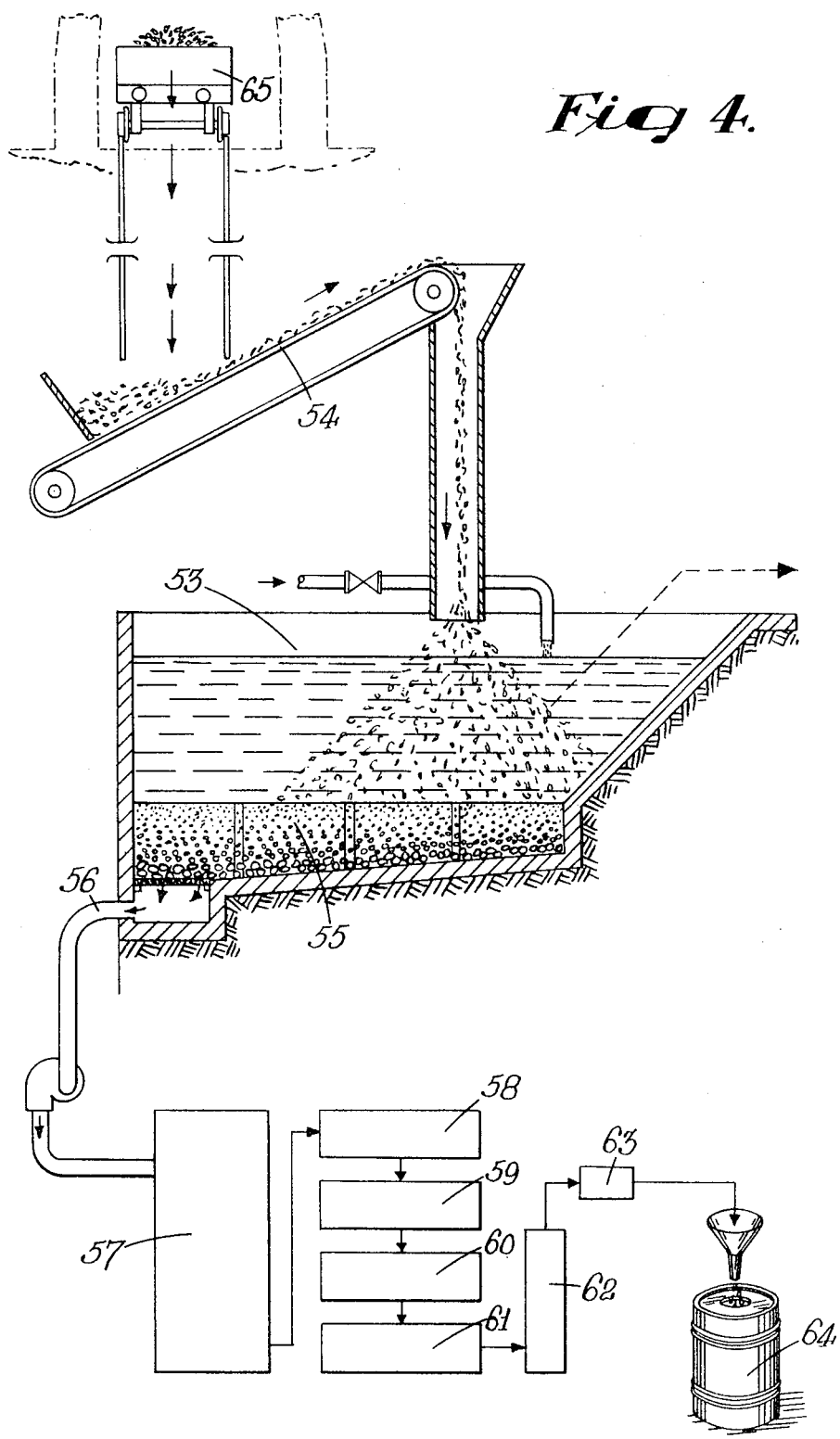

Beyond the outlet from the rotating kiln the processing of the calcine to yield vanadium pentoxide is known art, and the general treatment of the raw material up to the stage illustrated in FIG. 3 is likewise common crushing and milling technique. However, applicants desire to describe an entire layout involving the employment of the rotating kiln wherein the novel additives are used for extracting vanadium so that those skilled in the art will be readily able to build a complete plant for the purpose in mind.

It has been found that a fairly substantial increase in the extraction of vanadium is obtained with the method described above compared to that obtained through a Skinner roaster. Further, the equipment employed in exercising the method is of a simpler nature than the Skinner roaster and is more easily maintained in a serviceable state.

Tests have shown that the process of "ringing up" within a kiln bore is substantially reduced by operating under the conditions specified in the appended claims with the additives employed on the basis of the sodium sulphate consisting less than 3% by weight of the total mix and less than 3% by weight of the total mix being made up of at least one of the substances selected from the group consisting of sodium carbonate and sodium bicarbonate.

We claim:
1. A method of extracting vanadium from vanadiferous iron ores with reduced kiln ringing-up, comprising comminuting the ore, adding less than 3% by weight of the total mix of sodium sulphate and less than 3% by weight of the total mix of at least one of the substances selected from the group consisting of sodium carbonate and sodium bicarbonate, passing the mix into an inclined kiln equipped with a burner at its lower end, the upper end of the kiln constituting the inlet end, raising the temperature of the kiln to give a temperature gradient within the kiln such that the temperature at the lower outlet end of the kiln varies from about 1100 to 1300 degrees C., and permitting the vanadium in the mix to react with at least one of the additives to yield a soluble vanadium compound in the product of the kiln.

2. The method claimed in claim 1 in which the temperature of the mix is raised in the kiln in the presence of about 4% free oxygen.

3. The method claimed in claim 2 wherein the sodium sulphate constitutes about 1% of the total mix and the additives collectively constitute about 3½% of the total mix.

References Cited

UNITED STATES PATENTS

| | | |
|---|---|---|
| 1,482,276 | 1/1924 | Stokes _____ 23—(19.1) |
| 1,531,541 | 3/1925 | Carpenter _____ 23—(19.1) |
| 1,674,806 | 6/1928 | Stokes _____ 23—16 |
| 3,206,276 | 9/1965 | Burwell et al. _____ 23—51X |

FOREIGN PATENTS

| | | |
|---|---|---|
| 583,357 | 9/1959 | Canada _____ 23—(19.1) |

HERBERT T. CARTER, Primary Examiner

U.S. Cl. X.R.

23—18, 19, 51, 140